United States Patent [19]

Durbin et al.

[11] Patent Number: 4,491,648

[45] Date of Patent: Jan. 1, 1985

[54] POLYMER BLEND COMPOSITION

[75] Inventors: Daniel P. Durbin, Sugar Land; Robert G. Lutz, Spring, both of Tex.

[73] Assignee: Shell Oil Company, Houston, Tex.

[21] Appl. No.: 614,364

[22] Filed: May 29, 1984

[51] Int. Cl.$^3$ .................. C08L 53/02; C08L 69/00
[52] U.S. Cl. .................. 525/89; 524/505; 525/92; 525/901
[58] Field of Search .................. 525/89, 92, 468, 901; 524/505

[56] References Cited

U.S. PATENT DOCUMENTS

| | | | |
|---|---|---|---|
| 2,914,505 | 11/1959 | Roper et al. | 260/45.5 |
| 3,641,212 | 2/1972 | Narayana et al. | 261/893 |
| 4,097,550 | 6/1978 | Haaf et al. | 260/876 B |
| 4,124,654 | 11/1978 | Abolins et al. | 260/876 B |
| 4,243,766 | 1/1981 | Abolins et al. | 525/92 |
| 4,377,647 | 3/1983 | Durbin et al. | 525/92 |

*Primary Examiner*—Theodore E. Pertilla
*Attorney, Agent, or Firm*—Peter A. Bielinski

[57] ABSTRACT

A thermoplastic molding composition having good low temperature properties, low distortion at paint bake temperatures, and overall shrinkage similar to shrinkage of thermoplastic olefins comprises the blend of a selectively hydrogenated monoalkenyl arene-conjugated diene block copolymer, a vinyl aromatic-$\alpha$, $\beta$-unsaturated cyclic anhydride copolymer, a polycarbonate, and a saturated diblock copolymer.

6 Claims, No Drawings

POLYMER BLEND COMPOSITION

BACKGROUND OF THE INVENTION

1. Field of the Invention

This invention relates to a polymer blend composition. More particularly, this invention relates to a polymer blend composition comprising a selectively hydrogenated block copolymer, a vinyl aromatic copolymer, polycarbonate and optionally a saturated diblock copolymer.

2. Description of the Prior Art

Vinyl aromatic resins, such as polystyrene or high impact polystrene have been found to be useful in thermoplastic molding compositions. However, such vinyl aromatic resins have poor heat distortion and impact resistance. One approach to improve these property deficiencies involves copolymerizing the vinyl aromatic with an $\alpha$, $\beta$-unsaturated cyclic anhydride, to form copolymers such as poly(styrene-maleic anhydride). Although such copolymers have improved heat resistance, the overall balance of properties is still inadequate.

In order to further improve the properties of such vinyl aromatic copolymers, various other polymers have been blended with the copolymer. For example, blends of nitrile rubber and styrene-maleic anhydride copolymers are disclosed in U.S. Pat. Nos. 2,914,505 and 3,641,212. Blends of styrene-maleic anhydride copolymers with radial styrene-diene block copolymers and an optional polyphenylene ether resin are disclosed in U.S. Pat. No. 4,097,550. Still further, blends of styrene-maleic anhydride copolymers, hydrogenated styrene-diene block copolymers and optional polyphenylene ether resins are disclosed in U.S. Pat. Nos. 4,124,654 and 4,243,766. Such polymer blend compositions are still not ideal.

Blends of styrene-maleic anhydride copolymers, hydrogenated styrene-diene-styrene copolmers and thermoplastic polyesters disclosed in U.S. Pat. No. 4,377,647 show good properties especially when blended with oils.

U.S. Application Ser. No. 502,407 discloses blends of triblock copolymer, a vinyl aromatic copolymer, a polyester and a diblock. These blends showed good properties but exhibited excessive shrinkage after molding and painting.

A characteristic property of any thermoplastic molding composition is mold shrinkage. Parts molded from some polymers also exhibit shrinkage after the molding process when exposed to higher temperatures for some period of time. This shrinkage can pose of significant problem.

Experimentation with blends containing styrene-diene-styrene copolymers such as those mentioned above has shown the blends to exhibit a constant volume shrinkage in the injection/compression mold orientation directions when allowed to reach equilibrium at 250° F.

Blends of these block copolymers as described above have been found to possess properties desirable for painted exterior automotive application. The automotive industry has been using molds and tools cut for thermoplastic olefin (TPO) materials. These materials have an overall shrinkage of about 18 mils per inch and the molds have been designed to accomodate this.

In order to allow use of existing TPO molds a material with an overall shrinkage when allowed to reach equilibriums at 250° F. of about 18 mils per inch is needed. The overall shrinkage of a painted, injection molded automotive part consists of two components; that occuring during the injection molding process (mold shrinkage) and that occuring during the paint baking process (oven shrinkage). In order to achieve a particular part size, tooling must be designed to accomodate both of the shrinkages. The typical equilibrium shrinkage characteristics of typical exterior automotive materials are shown in Table I.

TABLE I

SHRINKAGE CHARACTERISTICS OF EXTERIOR AUTOMOTIVE MATERIALS

| | Mold Shrinkage | Oven Shrink | Total Shrink |
|---|---|---|---|
| BF Goodrich Estane 58130 (Thermoplastic urethane) | 8 Mils | 4 Mils | 12 Mils |
| Mobay Merlon 40 (Polycarbonate) | 6 Mils | 4 Mils | 10 Mils |
| General Electric Xenoy 1200 (Alloy) | 17 Mils | 12 Mils | 29 Mils |
| General Electric Valox 310 (polybutylene-terethalate) | 20 Mils | 6 Mils | 26 Mils |
| Republic 3041 (thermoplastic olefin) | 13 Mils | 5 Mils | 18 Mils |
| Shell Kraton 7827 (thermoplastic olefin) | 12 Mils | 3 Mils | 15 Mils |

Applicants have discovered that by adding polycarbonate to the blends replacing the PBT, the equilibrium shrinkage of the blends after molding and painting could be decreased to about 18 mils per inch total with a wide range of component ratios. Excellent physical and painting properties were also maintained with the blends making them good candidates for exterior decorated automotive parts.

SUMMARY OF THE INVENTION

The present invention is directed to a polymer blend composition having an unobvious balance of properties. In particular, the present invention relates to a thermoplastic molding composition comprising:

(a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymer;

(b) from about 10 to about 80 percent by weight of a vinyl aromatic copolymer comprising a vinyl aromatic compound and an $\alpha$, $\beta$-unsaturated cylic anhydride; and (c) from about 10 to about 80 percent by weight of polycarbonate;

(d) from about 0 to about 50 percent by weight of a hydrogenated diblock copolymer comprising a monoalkenyl arene polymer and a hydrogenated conjugated diene polymer.

The composition according to the invention are readily processable into parts, possess good low temperature ($-20°$ F.) properties, are directly paintable with commercial paints and have shrinkage during the molding and paint bake cycle (250° F., 30 minutes) similar to the thermoplastic olefin materials currently being used. Further, these compositions have excellent surface appearance, making them prime candidates for exterior automotive applications. It is significant that parts molded and painted using the compositions according to the invention are also less expensive than some competitive materials in exterior automotive parts. Still further, as shown in the Examples which follow the impact/stiffness relationship shows that it is possible to obtain good stiffness without the incorporation of oil.

DETAILED DESCRIPTION OF THE INVENTION

There are four major components in the polymer compositions of the present invention—a selectively hydrogenated block copolymer component, a vinyl aromatic copolymer component, polycarbnate and a saturated diblock copolymer component.

A. SELECTIVELY HYDROGENATED BLOCK COPOLYMER

The block copolymer employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the percursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the composition of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene(SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one or both of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1(EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 250,000, preferably from 35,000 to about 200,000. These molecular weights are most accurately determined by tritium counting methods or osmotic pressure measurements.

The proportion of the monoalkenyl arene blocks should be between about 8 and 65% by weight of the block copolymer, preferably between about 10 and 30% by weight.

While the average molecular weight of the individual blocks is not critical, at least within the above specified limits, it is useful to select the type and total molecular weight of the block copolymer in order to obtain the necessary mixing under the chosen blending conditions. Best results are obtained when the viscosity of the block copolymer and the other thermoplastic resins are substantially the same at the temperature used for blending and processing. In some instances, matching of the viscosity of the block copolymer portion and the resin portions are best achieved by using two or more block copolymers or resins. For example, a blend of two block copolymers having different molecular weights or a blend of a hydrogenated SBS and hydrogenated SIS polymers may be employed.

B. VINYLAROMATIC COPOLYMER

The copolymers of the vinyl aromatic compounds and the $\alpha, \beta$-unsaturated cyclic anhydride are well known and are described in the literature. The vinyl aromatic component may be derived from compounds of the formula:

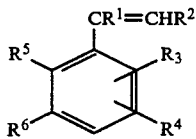

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower lakyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl groups. These compounds are free of any substituent that has a tertiary carbon atom. Styrene is the preferred vinyl aromatic compound. The α, β-unsaturated cyclic anhydrides include maleic anhydride, citraconic anhydride, itaconic anhydride, aconitic anhydride and the like. The preferred α, β-unsaturated cyclic anhydride is maleic anhydride.

These polymers may comprise 40 to 1 mole percent of the α, β-unsaturated cyclic anhydride and from 60 to 99 mole percent of a vinyl aromatic compound. The preferred polymers will contain about 25–5 mole percent of the α, β-unsaturated cyclic anhydride and 75–95 mole percent of the vinyl aromatic compound. The preparation of these copolymers are described in U.S. Pat. Nos. 2,971,939; 3,336,267 and 2,769,804 which are hereby incorporated by reference. Preferred copolymers are ARCO's Dylark ® 332 styrene-maleic anhydride copolymer, which is a styrene-maleic anhydride copolymer containing about 8 mole % maleic anhydride, the balance being styrene, or Dylark ® 350 or 700 which are rubber modified version of Dylark ® 332.

C. POLYCARBONATES

The polycarbonates utilized in the preparation of the blends of this invention are of the general formulae

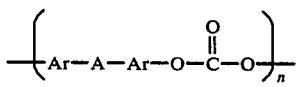

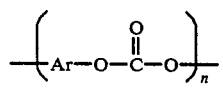

wherein Ar is selected from the group consisting of phenylene and alkyl, alkoxyl, halogen and nitro-substituted phenylene; A is selected from the group consisting of carbon-to-carbon bonds, alkylidene, cycloalkylidene, alkylene, cycloalkylene, azo, imino, sulfur, oxygen, and sulfoxide, and n is at least two.

The preparation of the polycarbonates is well known and the details thereof need not be delineated herein. There are a variety of preparative procedures set forth in Chemistry and Physics of Polycarbonates by Herman Schnell, Interscience Division of John Wiley & Co., New York (1964), first edition, as well as in British Pat. No. 772,627 and U.S. Pat. No. 3,028,365. In general, a preferred reaction is carried out by dissolving the dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied dependent upon the reaction conditions.

The preferred polycarbonate utilized in this invention is obtained when Ar is p-phenylene and A is isopropyl-para'-isopropylidenediphenol with phosgene and is sold by General Electric Company under the tradmark LEXAN ® and by Mobay under the trademark MERLON ®. This commercial polycarbonate typically has a molecular weight of around 18,000 and a melt temperature of over 230 ° C. Other polycarbonates may be prepared by reacting other dihydroxy compounds, or mixtures of dihydroxy compounds, with phosgene. The dihydroxy compounds may include aliphatic dihydroxy compounds although for best high temperature properties aromatic rings are essential. The dihydroxy compounds may include within the structure diurethane linkages. Also, part of the structure may be replaced by siloxane linkage. These and other variations of polycarbonate structure are described in the Schnell reference cited above. The same reference presents a long list of monomers (particularly dihydroxy compounds) that may be used in polycarbonate synthesis.

D. SATURATED DIBLOCKS

Saturated diblock copolymers useful in the present invention are referred to as $(A-B)_n$ type in which A represents a block of the group consisting of styrene polymer blocks or hydrogenated products thereof while B represents a polymer block of the groups consisting of alpha olefin polymers, conjugated diene polymers, and hydrogenated conjugated diene polymer blocks and n is an integer between 1 and 25. In the latter case at least about 50% of the original olefinic double bonds have been reduced by hydrogenation. The present invention furthermore contemplates the average molecular weight limitations of each of these blocks, block A being limited to average molecular weights between about 5,000 and 50,000 (preferably 9,000 and 35,000) which B is limited to average molecular weights between about 10,000 and 1,000,000 (preferably 15,000 and 200,000). Thus typical block copolymers are polystyrene-polyisoprene, polystyrene-polybutadiene, polystyrene-polyethylene, polystyrene-ethylene-propylene copolymer, polystyrene-ethylene-butylene copolymer, polyvinylcyclohexane-hydrogenated polyisoprene, polyvinylcyclohexane-hydrogenated polybutadiene.

The conjugated dienes which may be employed in forming the block polymers to be later hydrogenated include especially butadiene and isoprene as well as mixtures thereof. If block copolymers are formed incorporating alpha olefin blocks as the blocks B, the preferred species include ethylene propylene, and butylene, and mixtures thereof.

The blocks A and B may be either homopolymer or copolymer blocks. A typical polymer of this type prior to hydrogenation will have the structure polystyrene SBR.

The block copolymers are hydrogenated to reduce their olefinic unsaturation by at least 50% and preferably at least 80% of the original olefinic double bonds.

Hydrogenation is preferably carried out in solution utilizing either homogeneous or heterogeneous catalysts. Preferably, the more readily saturated olefinic double bonds are reduced at relatively mild hydrogenation conditions or by the use of a hydrogenation catalyst selective to the olefinic double bonds.

Catalysts such as cobalt or nickel salts or alkoxides reduced with aluminum alkyl compounds preferably are employed as catalysts. Suitable catalysts include nickel acetate, nickel octoate, or nickel acetyl acetonate reduced with aluminum alkyl compounds such as aluminum triethyl or aluminum triisobutyl.

U.S. Pat. Nos. 4,036,910 and 3,763,044 disclose styrenealphaolefin polymers which may be used in the compositions of the present invention and are hereby incorporated by reference.

E. ADDITIONAL COMPONENTS

The polymer blends of the instant invention may be compounded further with other polymers, oils, fillers, reinforcements, antioxidants, stabilizers, fire retardants, antiblocking agents and other rubber and plastic compounding ingredients without department from the scope of this invention.

Examples of various fillers that can be employed are in the 1971-1972 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers asbestos, boron fibers, carbon and graphite fibers, whiskers, quartz and silica fibers, ceramic fibers, metal fibers natural organic fibers, and synthetic organic fibers. Especially preferred are reinforced polymer blends of the instant invention containing about 2 to about 80 percent by weight based on the total weight of the resulting reinforced blend.

F. MIXING CONDITIONS

The relative proportions of the polymers are presented below in percent by weight:

|  | Preferred | More Preferred |
|---|---|---|
| Selectively hydrogenated block copolymer | 10 to 85 | 30 to 70 |
| Vinyl aromatic copolymer | 10 to 80 | 15 to 40 |
| Polycarbonate | 10 to 80 | 15 to 40 |
| Hydrocarbon oil | 0 to 50 | 1 to 10 |
| Hydrogenated diblock copolymer | 1 to 50 | 5 to 20 |

The blending of the various polymer components may be done in any manner that produces a blend which will not delaminate on processing. For example, the various polymers may be dissolved in a solvent common for all and coagulated by admixing in a solvent in which none of the polymers are soluble. But more preferably, a particularly useful procedure is to intimately mix the polymers in the form of granules and/or power in a high shear mixer. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, the processing temperature may also be chosen so as to permit the isoviscous mixing of the polymers. Typically, the mixing or processing temperature is between about 200° C. and about 350° C. For blends containing polycarbonate Tp is preferably between about 250° C. and about 300° C.

The polymer blends of the instant invention can be employed in any use typically performed by engineering thermoplastics, such as metal replacement and those areas where high performance is necessary. A particularly useful end use area is for exterior decorated automotive applications.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

The physical test methods used in evaluation of the blends appearing in Table II are as follows:

$-20°$ F. Cold Impact Strength—Gardner Impact Test
Stiffness—Tinius Olsen Stiffness Test, ASTM D-747
Tensile Strength—Die D, ASTM D-412
Elongation—Die D, ASTM D-412
Angle Tear—Die C, ASTM D-624

ILLUSTRATIVE EMBODIMENTS

In the Illustrative Embodiments, various polymer blends 1-5 were prepared according to the invention. Blends 6 and 7 were prepared using the Prior Art. All blends were prepared by first dry blending the various component particles, and then extruding the resulting mixture in a 30 mm Baker Perkins twin screw extruder at a temperature above about 250° C.

The three block copolymer component was a selectively hydrogenated SBS block copolymer, which vary in molecular weight and percent styrene. All blends contain a standard antioxidant. The various formulations and resulting properties are presented below in Table II.

The diblock copolymer was an S-EP diblock (a selectively hydrogenated SI).

The SMA employed in the blends according to the present invention and the controls were similar to Dylark 350 or 700.

The polybutylene terethalate is similar to Valox ® 310, a commercial grade of PBT available from General Electric.

Mold shrinkages were determined by measuring the mold and the molded article, after molding, and after heating. Heating was accomplished using an automatic dilatometer, Unitherm ® dilatometer, was used. The samples were heated from 23° to 121° C. then soaked for 30 minutes to 1 hour then cooled back to RT and measured.

The total shrinkage of the blends according to the present invention is closer to the target total shrinkage of 18 mils with many being less than 18 mils shrinkage. It is evident that shrinkage can be reduced and controlled by the addition of polycarbonate. It is important that the blends according to the invention maintained good stiffness, angle tear, impact and tensile properties. Blend number 2 according to the invention had approximately the same stiffness while the shrinkage was reduced by between 6 and 10 mils.

TABLE II

| Blend/Component | 1 | 2 | 3 | 4 | 5 | 6 | 7 |
|---|---|---|---|---|---|---|---|
| Three block copolymer | 40 | 30 | 40 | 50 | 40 | 40 | 30 |
| Polycarbonate | 30 | 36 | 24 | 30 | 36 | — | — |
| Diblock copolymer | 10 | 10 | 20 | | | 10 | 10 |
| Styrene-maleic anhydride | 20 | 24 | 16 | 30 | 24 | 25 | 30 |
| Polybutylene terepthalate | | | | | | 25 | 30 |
| Ultimate Tensile Strength (psi) = | 3100 | 3700 | 2100 | 2900 | 3400 | 2800 | 3000 |
| ⊥ | 2400 | 2800 | 1600 | 2700 | 3000 | 2900 | 2600 |
| Ultimate Elongation (%) = | 130 | 140 | 120 | 100 | 80 | 310 | 400 |
| ⊥ | 180 | 120 | 180 | 180 | 120 | 360 | 390 |
| Angle Tear (pli) = | 460 | 510 | 430 | 520 | 700 | 600 | 690 |
| ⊥ | 420 | 460 | 380 | 400 | 400 | 580 | 590 |
| Stiffness (psi/rad) | 36,600 | 49,100 | 26,900 | 31,200 | 45,200 | 33,500 | 99,500 |
| Mold Shrinkage (mils/inch) = | 6.8 | 7.4 | 8.0 | 10.5 | 7.5 | 8.7 | 9.0 |
| ⊥ | 9.6 | 9.4 | 10.1 | 7.5 | 5.0 | 11.6 | 8.6 |
| Equilibrium Oven | | | | | | | |
| Shrinkage at 250° F. (mils/inch) = | 8.2 | 6.6 | 11.9 | 7.0 | 5.4 | 14.8 | 15.9 |
| ⊥ | 9.3 | 6.9 | 12.4 | 6.1 | 4.3 | 14.0 | 13.9 |
| Total Shrinkage (mils) = | 15.0 | 14.0 | 19.9 | 12.5 | 12.9 | 23.5 | 24.9 |
| ⊥ | 18.9 | 16.3 | 22.5 | 13.6 | 9.3 | 25.6 | 22.5 |
| Gardner Impact −20° F. (ft. lbs/in) | 207 | 193 | 180 | 180 | 100 | 214 | 177 |

= indicates in the mold orientation direction; and
⊥ indicates perpendicular to the mold orientation direction.

What is claimed is:

1. A thermoplastic molding composition comprising:
   (a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymers wherein at least 80% of the aliphatic double bonds in block B are hydrogenated and no more than about 25% of the alkenyl aromatic double bonds in block A are hydrogenated;
   (b) from about 10 to about 80 percent by weight of a vinyl aromatic copolymer comprising a vinyl aromatic compound and an α, β-unsaturated cyclic anhydride; and
   (c) from about 10 to about 80 percent by weight of a polycarbonate;
   (d) from about 0 to about 50 percent by weight of a hydrogenated diblock copolymer comprising a monoalkenyl arene polymer and a hydrogenated conjugated diene polymer.

2. The composition of claim 1 wherein said selectively hydrogenated block copolymer is a linear ABA block copolymer.

3. The composition of claim 1 wherein said selectively hydrogenated block copolymer is a coupled or radial $(AB)_x BA$ block copolymer wherein x is an integer equal to or greater than 2.

4. The composition of claim 1 wherein said vinyl aromatic copolymer is a styrene-maleic anhydride copolymer.

5. The composition according to claim 1 also containing 0 to 30 percent by weight of a hydrocarbon extending oil.

6. The composition according to claim 1 wherein the relative amounts of each component are:
   (a) about 30 to about 70 weight percent block copolymer,
   (b) about 15 to about 40 weight percent vinyl aromatic copolymer,
   (c) about 15 to about 40 weight percent polycarbonate, and
   (d) about 5 to about 20 weight percent of a diblock copolymer.

* * * * *